UNITED STATES PATENT OFFICE.

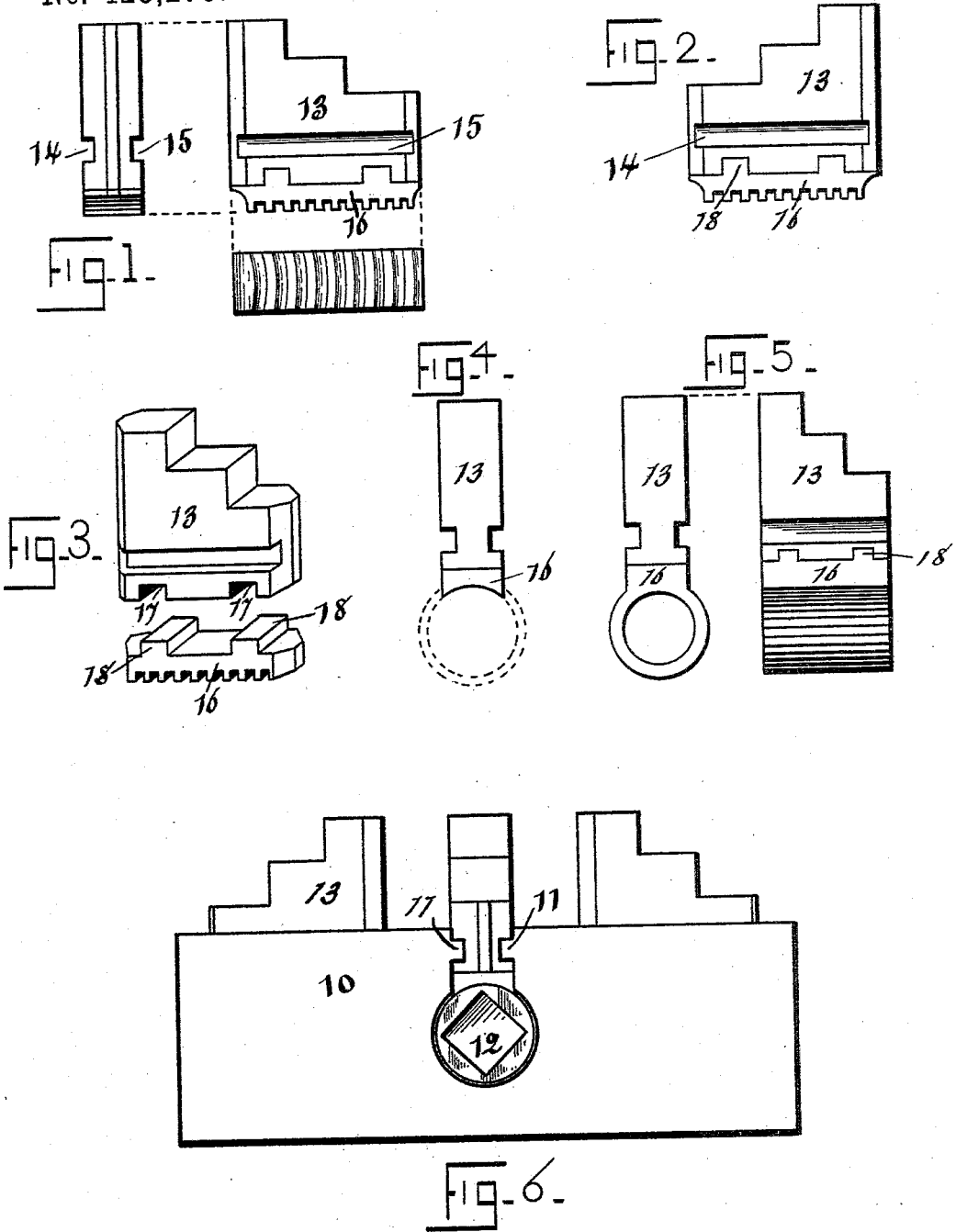

LUCIUS E. WHITON, OF NEW LONDON, CONNECTICUT.

REVERSIBLE JAW FOR CHUCKS.

SPECIFICATION forming part of Letters Patent No. 425,279, dated April 8, 1890.

Application filed July 12, 1889. Serial No. 317,316. (No model.)

*To all whom it may concern:*

Be it known that I, LUCIUS E. WHITON, a citizen of the United States, residing in the city and county of New London, and State of Connecticut, have invented a certain new and useful Improvement in Reversible Jaws for Chucks, which improvement is fully set forth and described in the following specification, reference being had to the accompanying sheet of drawings, in which—

Figure 1 shows face, edge, and end views of a jaw embodying my said invention and adapted for use in a so-called "scroll-chuck." Fig. 2 shows the jaw proper reversed on the rack-section. Fig. 3 is a perspective of the same with the two sections (jaw and rack) separated. In Fig. 4 I have shown an edge view of a chuck intended to be operated by a screw, (as in an independent jaw-chuck,) the nut, however, being largely cut away instead of surrounding said screw, as in the jaw shown in Fig. 5, these several constructions being more fully referred to hereinafter. Fig. 6 is an edge view of an independent jaw-chuck having jaws of the form shown in Fig. 4.

This invention has particular relation to that class of chucks in which provision is made for reversing the jaws, so that a single set of jaws may be adjusted for holding both outside and inside work. Such a result has been attained heretofore by forming each jaw of two separable parts, one of which is screwed or otherwise securely fastened to the companion part. So far as I am familiar with the state of the art, the two sections so formed have been separable outside or in front of the radial slots or ways in the chuck-case, in which the complete jaw slides, and great strain has been brought (when the chuck is in use) on the screws or other fastenings by which the two parts are clamped together.

My present invention seeks to provide a two-part jaw that is separable below or in the rear of the said radial slots or ways, thus dispensing with the screw-fastenings heretofore necessary. This reduces somewhat the cost of construction, and also renders the operation of reversing the jaws more simple and rapid than in other forms now in use.

Referring to the annexed drawings, 10 indicates the case of a chuck, said case being formed with a series of undercut radial slots formed by inwardly-projecting ribs 11, adapted to receive and support the series of jaws in such manner that said jaws may have a free longitudinal movement therein, but are held firmly against lateral displacement. Various mechanical means are used for actuating said jaws, in some forms the entire series being caused to move simultaneously, while in other forms each jaw of the series is moved by independent mechanism.

In Fig. 6 I have shown a chuck of the latter (independent jaw) kind, in which a screw 12 is located in the rear of each jaw-slot, said screw being arranged to simply rotate in its seat. The confronting edge of the jaw is threaded, and forms a sector of a nut that partially encircles said screw 12. Each jaw is formed with slots 14 15, that slip over and ride on the inwardly-projecting ribs 11, formed in the radial slots. When the described elementary parts are properly assembled, the rotation of screw 12 causes its individual nut, or, more properly, jaw, to travel outward or inward in its slot, according to the direction of rotation of said screw. Instead of a sector of a nut, as above described, a complete nut encircling the screw is sometimes provided, as in the form of jaw shown in Fig. 5. It is also a common practice to form the edge or rear side of the jaws with teeth substantially like a rack, as in Fig. 1, but of a pitch adapted to engage a scroll or helix located in the rear of the jaws and intended to move the series of jaws simultaneously.

The constructions thus briefly referred to are all old and well known, and form no part of my present invention.

That which I conceive to be new and novel lies in the construction of the jaws, which I form of two sections 13 16, the main section 13 being formed at opposite ends with holding-faces of convenient forms for both outside and inside work, and having grooves 14 15, already described, for engaging the ribs 11 in the chuck-case. The rear side or edge of said section 13 is provided with one or more transverse grooves 17, and the companion section 16 has one or more transverse ribs 18, that may enter and fill said grooves 17, thus serving to hold the two sections together.

Dowels of any practical form could be used; but I prefer the ribs and slots, as they are strong and cheaply provided. These transverse grooves and ribs should be so located relative to each other and to the ends of the jaw that when the sections 13 16 are separated and turned end for end and again assembled, the ends of one section will remain flush with the ends of the companion section. When the two sections are thus brought together and inserted radially into place in the chuck-case, as illustrated in Fig. 6, said sections are held against deflection and separation by the screw or scroll on one side and the ribs 11 on the other side; but they remain at all times free to move or be moved radially in said chuck-case. This construction renders it unnecessary to screw or otherwise clamp the two sections 13 16 together, as they cannot possibly be separated so long as they remain in the chuck-case. When it is desired to reverse the holding-jaws, they are removed from the case, the section 13 is reversed on the companion section 16, and the two sections are again returned to place in the chuck-case, no screw-driver or other special tool being required. The described construction accomplishes the desired object cheaply and practically, and does not in any degree reduce the holding power of the complete chuck.

Having described my invention, I claim—

1. A chuck-jaw formed of two separable sections, connected substantially as set forth, the line of separation of said sections being on that side of the radial supporting-ways opposite the working-face of the chuck.

2. A chuck-jaw formed of two sections that are separably united and held against longitudinal displacement on each other by transverse ribs 18 and grooves 17, substantially as set forth, the line of separation of the two sections being on that side of the radial ways (in which the jaw slides) opposite the outer or operative face of the complete chuck.

LUCIUS E. WHITON.

Witnesses:
D. E. WHITON,
FRANK H. ALLEN.